(12) United States Patent
Unternhahrer et al.

(10) Patent No.: US 6,374,513 B1
(45) Date of Patent: Apr. 23, 2002

(54) PROCESS FOR THE HEAT TREATMENT OF LIGNOCELLULOSIC MATERIAL

(75) Inventors: Roland Unternhahrer, Saint Clair du Rhone; Cyrille Chautemps, Chavanay; Jean-Pierre Bernon, Bourges, all of (FR)

(73) Assignee: Pluri-Capital (PCI) Inc., Jonquiere (CA)

( * ) Notice: Subject to any disclaimer, the term of this patent is extended or adjusted under 35 U.S.C. 154(b) by 0 days.

(21) Appl. No.: 09/319,840

(22) PCT Filed: Nov. 6, 1997

(86) PCT No.: PCT/FR97/01993

§ 371 Date: Sep. 2, 1999

§ 102(e) Date: Sep. 2, 1999

(87) PCT Pub. No.: WO98/25742

PCT Pub. Date: Jun. 18, 1998

(30) Foreign Application Priority Data

Dec. 13, 1996 (FR) .............................. 96 15352

(51) Int. Cl.⁷ ................................. F26B 7/00
(52) U.S. Cl. .............. 34/396; 34/381; 34/391; 34/393; 34/408; 34/428; 34/474
(58) Field of Search .................. 34/381, 391, 393, 34/396, 406, 408, 412, 428, 468, 474; 426/419, 640

(56) References Cited

U.S. PATENT DOCUMENTS

| 1,366,225 A | * | 1/1921 | Weiss | 34/396 |
| 1,678,559 A | * | 7/1928 | Devine | 34/411 |
| 3,131,034 A | * | 4/1964 | Marsh | 34/496 |
| 5,228,209 A | * | 7/1993 | Brunner | 34/417 |
| 5,433,905 A | * | 7/1995 | Tisch | 264/83 |
| 5,678,324 A | * | 10/1997 | Viitaniemi et al. | 34/396 |
| 5,819,436 A | * | 10/1998 | Helevirta | 34/408 |
| 5,979,074 A | * | 11/1999 | Brunner et al. | 34/396 |
| 6,014,819 A | * | 1/2000 | Elder | 34/396 |
| 6,119,364 A | * | 9/2000 | Elder | 34/212 |

* cited by examiner

Primary Examiner—Pamela Wilson
(74) Attorney, Agent, or Firm—Townsend and Townsend and Crew LLP

(57) ABSTRACT

A process for the heat treatment of lignocellulosic material where the material is perheated and dried at a temperature close to the vaporization temperature of water, heated in a reducing atmosphere and cooled by the injection of water vapor.

10 Claims, 4 Drawing Sheets

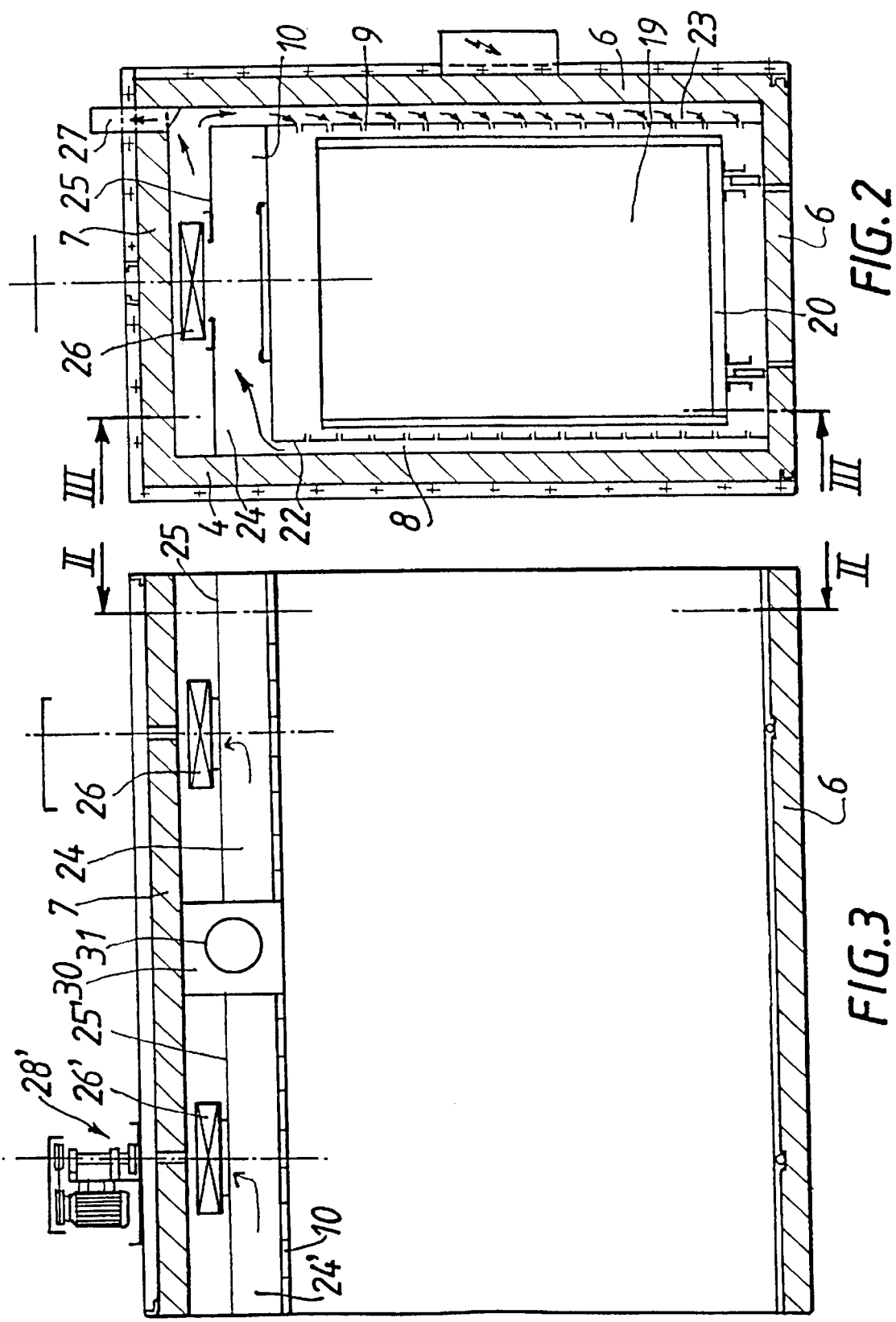

PROCESS FOR THE HEAT TREATMENT OF LIGNOCELLULOSIC MATERIAL

BACKGROUND OF THE INVENTION

The present invention relates to apparatus and to a method for carrying out high temperature treatment of lignocellulosic material, such as wood.

High temperature treatment of lignocellulosic material;, such as wood, makes it possible to reduce their moisture content and improve their stability characteristics.

Various methods and apparatus for carrying out high temperature treatment of lignocellulosic materials are known. FR-A-2,720,969 discloses such a method and a cell for carrying it out. This document discloses drying of the materials, followed by heating in a closed circuit during which the gases released by the material are employed as a fuel, and finally, cooling by injection of water. The closed-circuit heating step disclosed in this document does not make it possible to ensure residual humidity, remaining after the drying step, is completely eliminated. Additionally, the use of the gases released by the material as a fuel involves control of the treatment plant which is difficult to achieve in practice. Finally, injecting water for cooling leads to the material treated splitting or breaking up. The cell disclosed in that document for carrying out the method has corresponding disadvantages, and in practice, it is difficult or even impossible to carry out material treatment inside it. In particular, it is difficult, with this apparatus, to ensure that the gases released are subject to combustion, as proposed in the method, and it is also difficult and dangerous to carry out heating in a closed circuit.

SUMMARY OF THE INVENTION

The invention discloses a method and apparatus making it possible to overcome these disadvantages. It provides simple, effective, high temperature treatment, preserving the mechanical properties of the material, and is easy to carry out in practice. The apparatus of the invention has a simple and robust structure, and makes it possible to provide effective treatment without the need for complicated adjustments. The invention notably allows automatic control of treatment.

More precisely, the invention provides apparatus for high temperature treatment of lignocellulosic material, comprising a treatment chamber for the material, at least one combustion chamber with at least one burner operating in a reducing atmosphere, mixing means providing a circulation of treatment chamber gases whereby a portion of the gases originating from the treatment chamber circulate through the combustion chamber.

The apparatus can comprise an induction channel for gases in the treatment chamber, linked to an induction side of said mixing means, a delivery channel for gases to the treatment chamber, linked to a delivery side of the mixing means, a branch on said induction channel, said branch on the induction channel being linked to the combustion chamber, and a branch on the delivery channel, said branch on the delivery channel being linked to the combustion chamber.

In this case, the branch on the induction channel or delivery channel can terminate in the combustion chamber close to the burner.

The apparatus can further comprise at least one extraction chimney on the circulation path of the treatment chamber gases, downstream of said mixing means.

The apparatus can further comprise means for introducing water into the combustion chamber, close to said burner, and can further comprise temperature sensors for measuring a temperature externally of said material and a temperature within said material, and means for regulating one or more burners, whereby a substantially constant difference Δ is maintained between a temperature external of said material and a temperature within said material during treatment before cooling, said temperature difference being preferably dependent upon the cross-section of the material to be treated.

The temperature sensors advantageously comprise at least one sensor close to a wall of said treatment chamber for measuring the temperature externally of said material, and at least one mobile sensor arranged to be disposed inside a charge of material, for measuring the temperature within said material.

A method for high temperature treatment of lignocellulosic material is also disclosed, comprising the steps of
pre-heating and drying material at a temperature close to the vaporization temperature of water;
heating said material in a reducing atmosphere;
cooling said material by injecting water vapor.

The pre-heating and drying step is preferably continued until practically all the free water contained in said material has evaporated, preferably until the humidity of gases around said material is less than 12%.

The step of heating said material in a reducing atmosphere is preferably carried out until a temperature comprised between 200 and 240° C., and particularly between 220 and 230° C., is reached.

The step of heating said material in a reducing atmosphere is advantageously carried out while causing gases released by said material to circulate through a combustion chamber with at least one burner, in a reducing atmosphere.

The step of heating said material in a reducing atmosphere is preferably followed by a step in which said material is maintained at a temperature close to the temperature reached during said heating step.

The step of cooling said material by injecting water vapor can be followed by a cooling step, by circulation of air.

Treatment is advantageously carried out by maintaining a substantially constant difference between a temperature external of said material and a temperature within said material during the steps of pre-heating, drying, and heating, said difference being preferably dependent upon the cross-section of the material to be treated.

Other advantages and characteristics of the invention will become more clear from the description which follows of one embodiment of the invention, provided by way of example and with reference to the attached drawings.

BRIEF DESCRIPTION OF DRAWINGS

FIG. 2 is a side view in cross-section of the apparatus of FIG. 1.

FIG. 3 is a longitudinal cross-section of the apparatus in FIG. 1.

DETAILED DESCRIPTION OF PREFERRED EMBODIMENT

Figure 1:
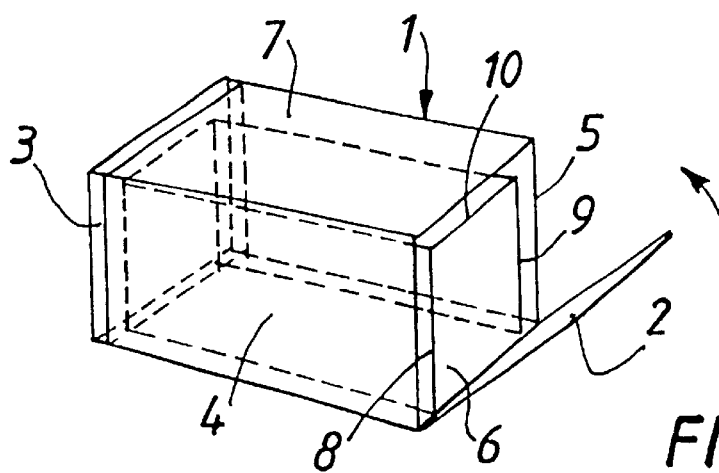
FIG. 1 is a diagrammatical view of apparatus according to the invention.

FIG. 1 is a diagrammatical view in perspective of apparatus according to the invention. The treatment apparatus comprises a cell 1, forming a rectangular cross-section tunnel designed to receive the material to be treated. The ends of cell 1 can be closed by means of a door 2 and a base 3. This configuration makes it possible, if needs be, to assemble several cells, for example for treating long or bulky charges. A cell according to the invention can for example measure 4.5 meters long, 1.45 meters wide and 2.15 meters high. These dimensions provide a useful treatment volume of some 6 to 10 cubic meters of lignocellulosic material.

Each cell comprises an outer sealed wall, preferably heat-insulated, ensuring mechanical stability of the cell, a treatment chamber with two lateral panels 4, 5, a floor 6 and a ceiling 7. Inside this outer wall, the cell has inner walls, defining a treatment chamber between the two openwork side panels 8, 9, an arched roof 10, and floor 6.

FIG. 2 is a diagrammatical view in lateral cross section of the apparatus of FIG. 1. In FIG. 2, the elements already described in FIG. 1 can be recognized. Additionally, a charge of the material to be processed 19, introduced into the treatment chamber on a truck or trolley 20 is shown in FIG. 2. On each side of the cell, the lateral panels of an outer wall 4 and 8, (respectively 5 and 9) define a channel 22 (respectively 23), provided for circulation of gases. On the induction side, on the left in FIG. 2, induction channel 22 terminates at an induction chamber 24, defined between the arched roof 10 and a horizontal wall 25 arranged above the latter. A mixing turbine 26, which can be driven by a motor-driven blower located externally of the cell, draws in the gases that are inside induction chamber 24, and discharges them partly into a discharge chimney 27, partly into a delivery chamber 23, and partly towards a combustion chamber which will be described below. The gases in the cell thus circulate from the treatment chamber to induction channel 22 via the openwork side panel 8, then to the induction chamber 24, pass through turbine 26 and are blown into delivery chamber 23, and then towards the treatment chamber through side panel 9.

FIG. 3 is a longitudinal cross section of the apparatus in FIG. 1, on a plane III—III of FIG. 2. Charge 19 and truck or trolley 20 are not shown in FIG. 3. FIG. 3 shows the plane II—II of the cross section in FIG. 2. As shown in FIG. 3, induction chamber 24 does not extend over the whole length of the cell: a combustion chamber 30 is provided between arched roof 10 and the ceiling 7; a burner 31 is provided inside chamber 30. In the embodiment of FIGS. 2 and 3, the combustion chamber is arranged close to the middle of the cell, having on each side of the combustion chamber, an induction chamber 24, 24' and a turbine 26, 26'. This configuration ensures that the gases get mixed homogeneously, using turbines of a reasonable size. One could also adopt different configurations, for example using two combustion chambers and one induction chamber with one or several turbines. On FIG. 3, one of the motor-driven blower units 28' has also been shown, driving mixing turbine 26'.

Figure 4:
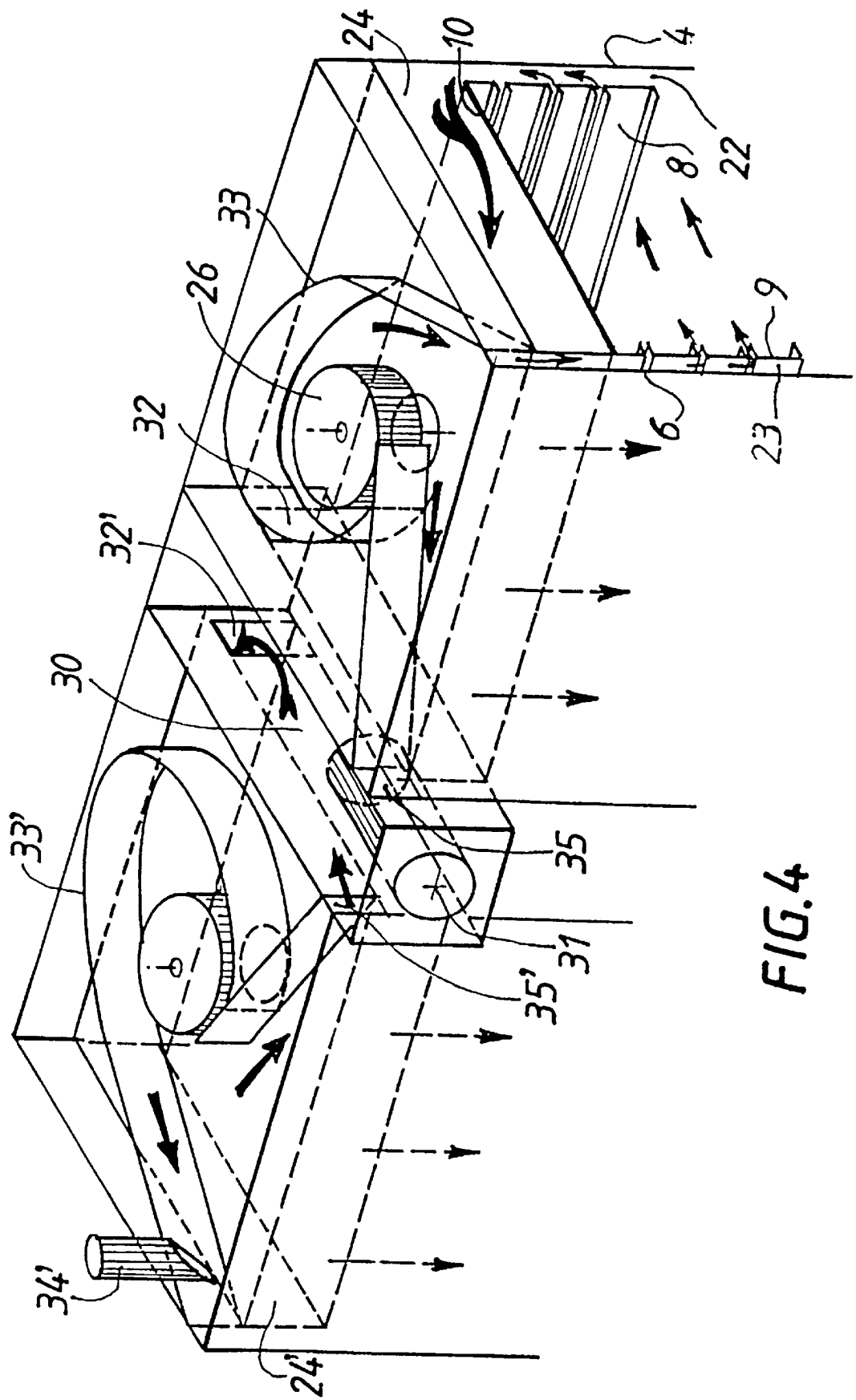
FIG. 4 is a top perspective view of the apparatus in FIG. 1, with partial removal to show inside detail.

FIG. 4 is a top view in perspective of the cell of the invention. Apart from the elements already described, FIG. 4 shows how combustion chamber 30 extends over the width of the cell and has, at its end opposite the location of burner 31, openings 32, 32', which discharge into the induction chambers 24 and 24'. These openings can advantageously be fitted with one or two regulating shutters making it possible to balance the flow originating from combustion chamber 30 towards induction chambers 24, 24'. FIG. 4 shows the baffles 33, 33' of the mixing turbines 26 and 26', which direct the air blown by the turbines in the direction of delivery channel 23, towards the extraction chimneys—only one of the two chimneys, 34, being shown—and towards openings 35, 35' which discharge into combustion chamber 30 close to burner 31. A humidity sensor is provided in at least one of the extraction chimneys.

Figure 5:
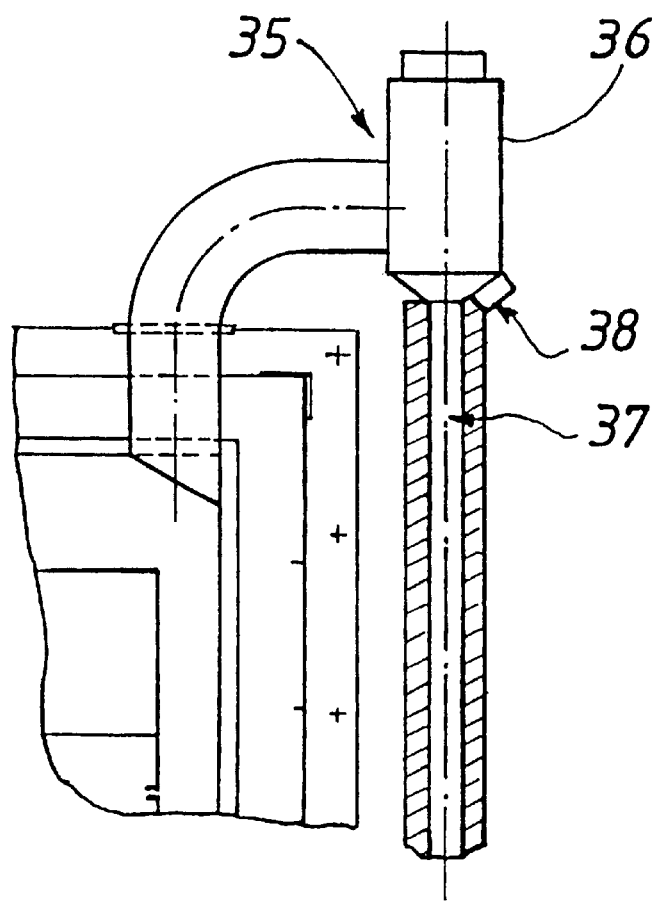
FIG. 5 is a cross-sectional view on a larger scale of a chimney of the apparatus in FIG. 1.
Figure 6:
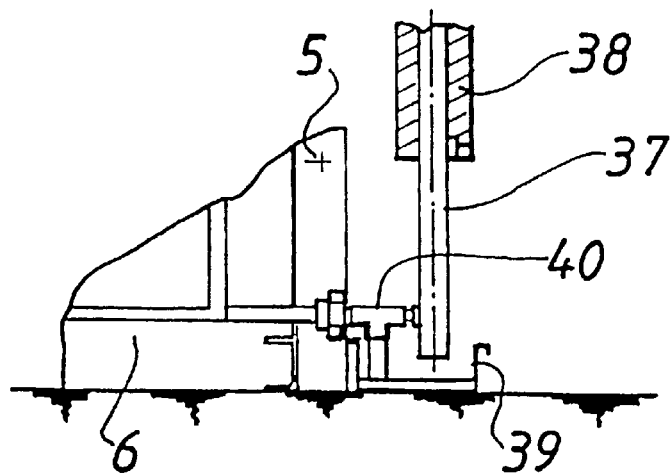
FIG. 6 is a cross-sectional view on a larger scale of a bubble chamber of the apparatus in FIG. 1.

Various constructional features, details of which follow, can advantageously be provided. The openwork side panels 8 and 9, can be constituted by horizontal members, adjustable in height so as to be able to provide larger or smaller gaps between them. One thus ensures homogeneous distribution of gas flow in the treatment chamber by providing smaller openings at the top of the openwork side panels 8, 9 compared to those at the bottom. As shown in FIG. 5, the chimneys 34 can be provided with tar extractors, in the form of a condenser 36, the condensed tars flowing downwardly from the condenser 36 into a vertical pipe 37 heated by a heating element 38. This prevents tar-laden gases being discharged into the atmosphere. At its lower end, pipe 37 discharges into a bubble trap 39 shown in FIG. 6. The bubble trap recovers the tars flowing in the pipe at 37. Also, via pipe 40, it receives tars flowing on the floor of the treatment chamber. The end of pipe 40 terminates at the bottom of bubble trap 39 to avoid exchange of gas, via pipe 40, between the outside environment and the treatment chamber.

Additionally, inside the treatment chamber, lines of water injectors are provided in order to avoid any danger of fire. The use of such lines of water injectors makes it possible to quickly cool the lignocellulosic material inside the cell, should ignition occur. This limits the risks of accidental fire. Advantageously, one can provide for these lines of water injectors to be supplied from a water reservoir located at the top of the treatment apparatus, and controlled by solenoid valves supplied with electricity from an independently-fed inverter; this makes it possible to compensate for a complete power failure or a lack of water supply, by keeping a security device ready on standby.

Temperature sensors are provided in the cell, and these can be used, as explained below, for controlling treatment. A water supply is also provided in the combustion chamber 30, close to the burner, the use of which will be explained below.

The device according to the invention permits effective and fast treatment of lignocellulosic material. The material is first loaded into the treatment apparatus. To achieve this, advantageously, trucks or trolleys of the type shown diagrammatically in FIG. 2 are used. Two meter long trucks, rendered integral with each other, which enter and leave the cell by a two-way chain driving mechanism with the drive means situated externally of the cell can be used. Such a system has the advantage of readily being adaptable to the length of the treatment apparatus: it is indeed sufficient, if for example, two cells, a door and a base are assembled in order to form a 9-meter long treatment apparatus, to lengthen the truck drive chain by a corresponding amount.

The material to be treated is stacked on trolleys or trucks, with battens arranged between each layer so that, during treatment, gases can circulate inside the charge. For the cell dimensions given above, a capacity of some 6 to 10 cubic meters of the material to be treated, depending on thickness, can be achieved.

Next, a temperature sensor is arranged inside the charge. The temperature sensors of the cell thus comprise one or several fixed sensors mounted close to the openwork side panels 8 and 9, and, for example, four or eight sensors mounted in the corners of the cell. They also comprise one or several sensors mounted on a flying lead inside the treatment chamber, in order to be able to be arranged inside the charge. In one preferred embodiment, three mobile sensors are used making it possible to measure the temperature inside the material, and four fixed sensors arranged on the walls of the treatment chamber.

Following this, the door of the apparatus is closed and treatment commences. For this, computer control can advantageously be provided, governed by the temperature measured by the fixed and mobile sensors, together with the degree of humidity measured by the humidity sensor or sensors.

Operation is based around the data measured by the sensors, taking account of various target parameters and the operation of the burner in the combustion chamber. The burner is designed to operate in a reducing atmosphere and ensures that the amount of oxygen in the combustion chamber always remains below a small percentage, for example some 3%. One can, for example, employ a Kromschroder burner model BIO 65 RG. 60 kW power is sufficient for the heat-treatment chamber dimensions given above. The burner is controlled by a solenoid valve which simultaneously controls flow of combustible gas, for example air and propane. The burner is additionally designed to be able to be re-ignited at any moment without pre-ventilation of the combustion chamber.

Figure 7:
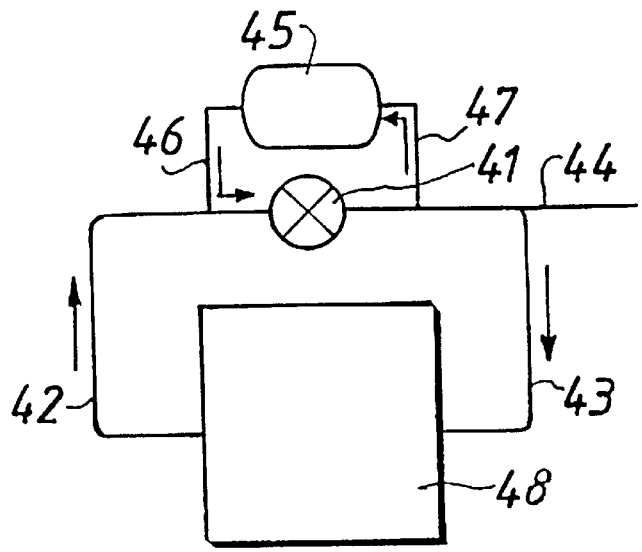
FIG. 7 is a diagram showing the circulation of gases in a second embodiment of apparatus according to the invention.

FIG. 7 is a diagrammatical representation of the gas flow in the invention. Reference numeral 48 indicates the treatment chamber. Reference numeral 41 indicates the means for mixing the gases. As symbolized by line 42, the mixing means draw gases into the treatment chamber 44 by an induction conduit. They then discharge them through a delivery conduit, as shown symbolically by the line 43. Part of the gases can escape through chimney 44, which is located on the delivery conduit at the outlet end of mixing means 41. According to the invention, the gases of combustion chamber 45 are also mixed by the mixing means 41, in parallel with those of the treatment chamber. This is achieved by providing an induction branch 46 on induction conduit 42, which terminates at one side of the combustion chamber. Another delivery branch 47 on delivery conduit 43 terminates at another side of combustion chamber 45, thereby ensuring good circulation of the gases inside the latter.

In the embodiment of FIGS. 2–4, the delivery branch 47 terminates close to the burner in the combustion chamber. Arrangements could also be made for induction conduit 46 to terminate close to the burner. In the apparatus of FIG. 3, it is sufficient, for this, to arrange the burner at the other end of the combustion chamber, or to modify the position of the openings in the combustion chamber.

In both cases, a partial circulation of the treatment chamber gases through the combustion chamber is achieved, as explained below.

Figure 8:
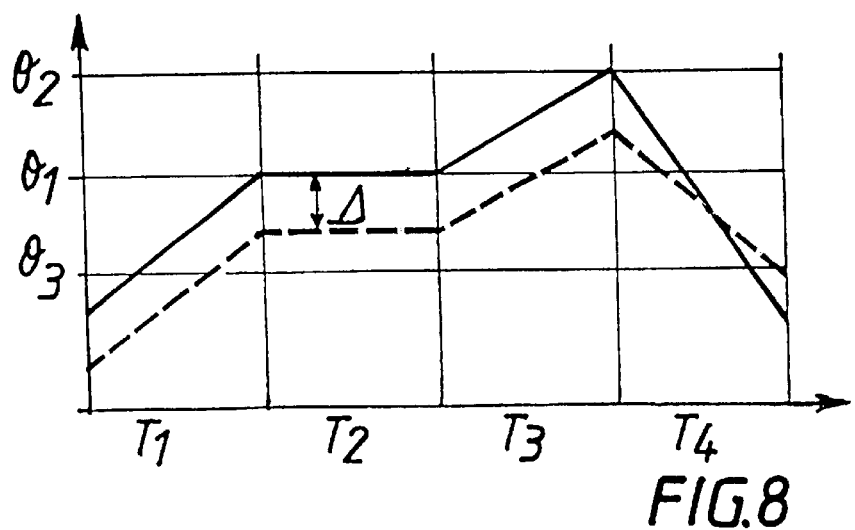
FIG. 8 is a diagram of temperature as a function of time during treatment according to the invention.

FIG. 8 shows how temperature measured by the fixed sensors (continuous line) and the mobile sensors (dashed line) varies with time. As shown in FIG. 8, the treatment apparatus can be controlled automatically thanks to the temperature sensors by maintaining a substantially constant difference Δ between the mean temperature supplied by the fixed sensors and the mean temperature supplied by the mobile sensors. This difference is advantageously a function of the thickness of the material to be treated: Table 1 shows the temperature difference, in ° C., as a function of the thickness of the material loaded onto the truck or trolley.

TABLE 1

| Δ(° C.) | thickness (mm) |
| --- | --- |
| 5 | 5–10 |
| 10 | 11–15 |
| 15 | 16–20 |
| 20 | 21–40 |
| 30 | 41–60 |
| 40 | 61–90 |
| 50 | >90 |

The Table shows the wide range of thicknesses of material that can be treated thanks to the invention.

The first step in treatment consists in pre-heating the material up to a drying temperature $\theta_1$. This temperature is sufficient to ensure the free water contained in the material evaporates, and is for example comprised between 100 and 120° C., preferably around 105° C. The duration T1 of this pre-heating step depends on the thickness and nature of the material to be treated. It is easy to control the burner to provide a progressive increase in temperature, while maintaining the difference Δ substantially constant, as shown in FIG. 7. One could also use another method for controlling the build-up of temperature.

Once the drying temperature $\theta_1$ has been reached, drying of the material is performed by maintaining this same temperature value, or a temperature substantially close to this, until such time as all of the water contained in the material has practically all evaporated. During this drying step, just like during the pre-heating step, the mixing turbines ensure a portion of the gases originating from the treatment chamber circulates through the combustion chamber. This makes it possible to maintain the temperature in the treatment chamber, by supplying, by means of the burner, the energy necessary to vaporize the free water. Operating the burner in a reducing atmosphere ensures that the material treated does not catch fire, even if it is brought up to a high temperature. During drying of the material, the burner is controlled as a function of the temperatures measured. The humidity in the extraction chimneys is also measured. The next step can be initiated when the free water content in the material has been practically all evaporated, for example when the degree of humidity at the chimneys is comprised between 10 and 20%, preferably 12%. This value is sufficient to ensure that subsequent treatment of the material proceeds correctly, and it is not essential, nor useful, to attempt to achieve more complete evaporation.

The duration T2 of the drying phase further depends on the nature of the material to be treated, on the quantity of free water that it contains as well as the dimensions of the material. The duration can be zero where the material is very dry at the outset, the free water then being evaporated during the pre-heating step.

Next, a step in which dried material is heated is performed by raising the temperature up to a target value $\theta_2$. This temperature again depends on the nature of the material to be treated, and is typically comprised between 200 and 240° C. It can be close to 220° C. for certain foliaceous species, such as chestnut or close to 230° for resinous woods, such as Douglas pine. The temperature rise can again be controlled using the temperatures measured by the fixed and mobile sensors; in this case, the duration T3 of this heating step is not determined in advance, but again depends on the nature of the material, its thickness, and on the charge inside the treatment chamber. During this step, the extraction chimneys remain open, to ensure that the residual water vapor and burned gases are discharged. The degree of oxygen inside the treatment apparatus is limited, so the burner is operating in a reducing atmosphere. Additionally, the heated material gives off a combustible mixture, which is burnt in the combustion chamber. One avoids thereby any danger of the material catching fire.

At the end of this heating step, it can be arranged to maintain the material at the target temperature value $\theta_2$; this is not essential to obtain the mechanical strength results one normally looks for in high temperature treatment, but it can make it possible to obtain a given coloring of the material.

Following this, the material is cooled. For this, using the burner, water is sprayed into the combustion chamber. The effect of this is to decrease the temperature in the treatment chamber without this creating any thermal shock. Additionally, this ensures more homogeneous cooling of the material than would be the case if one were to spray the water directly into the treatment chamber. Cooling is continued until the temperature inside the material, measured by a mobile sensor or sensors, is lower than a third temperature $\theta_3$, limiting the risk of the material catching fire upon leaving the treatment chamber. In practice, a temperature of around 80° C. is sufficient. During the whole of this cooling step, the extraction chimneys give off water vapor. A throughput of a quarter of a liter of water every 15 seconds provides effective cooling for the cell dimensions given above. From the moment where the temperature $\theta_3$ within the material has dropped to around 120° C., cooling is continued without injecting water vapor, by simply mixing the gases within the treatment chamber. During the cooling step, the temperature within the material to be treated becomes higher than the outside temperature, as shown on FIG. 8. Cooling can be controlled simply by controlling the amount of water injected.

To take the example of the treatment of wooden planks of 120×27 mm cross section in a foliaceous wood such as oak, the following parameters can be employed:

$\theta_1$=120° C.; $\theta_2$=220° C.; $\theta_3$=100° C.; $\Delta$=20 to 40° C.

Treatment is carried out with the following durations:

T1=5 to 8 hours; T2=1 to 4 hours; T3=2 to 6 hours; T4=15–45 minutes.

For treating 120×27 mm cross-section planks in wood such as Douglas pine, the following parameters can be employed:

$\theta_1$=120° C.; $\theta_2$=230° C.; $\theta_3$=80° C.; $\Delta$=20 to 30° C.

Treatment is performed with the following durations:

T1=4 to 7 hours; T2=2 to 3 hours; T3=1 to 5 hours; T4=15–45 minutes.

The invention makes it possible to treat lignocellulosic material completely automatically, in a simple fashion. Circulation of gases originating from the treatment chamber through the combustion chamber along with operation of the burner in a reducing atmosphere, makes it possible to simplify the structure of the apparatus.

Obviously, the invention is not limited to the embodiments described by way of example. One can thus vary the number and nature of the mixing devices in the combustion chamber as well as the number and nature of the burners. Another method of controlling the apparatus can be chosen, for example by programming the duration of each treatment step.

For measuring the temperature externally of the material, one or several temperature sensors could be used arranged other than in the treatment chamber, example in the induction channel or in the delivery channel. For measuring the temperature inside the material, one can use, as proposed above, a mobile sensor. Other means are possible, such as for example a probe.

What is claimed is:

1. A method for high temperature treatment of lignocellulosic material, comprising the steps of pre-heating and drying said material at a temperature close to the vaporization temperature of water;

heating said material in a reducing atmosphere;

cooling said material by injecting water vapor.

2. The method according to claim 1, wherein the pre-heating and drying step is continued until practically all the free water contained in said material has evaporated.

3. The method according to claim 1, wherein the step of heating said material in a reducing atmosphere is carried out until a temperature comprised between 200 and 240° C. is reached.

4. The method according to claim 1, wherein the step of heating said material in a reducing atmosphere is carried out while causing gases released by said material to circulate through a combustion chamber with at least one burner that is maintained in a reducing atmosphere.

5. The method according to claim 1, wherein the step of heating said material in a reducing atmosphere is followed by a step in which said material is maintained at a temperature close to the temperature reached during said heating step.

6. The method according to claim 1, wherein the step of cooling said material comprises injecting water vapor into a combustion chamber with at least one burner followed by a cooling step, by circulation of air.

7. The method according to claim 1, wherein treatment is carried out by maintaining a substantially constant difference between a temperature external of said material and a temperature within said material during the step of pre-heating and drying, and the heating step.

8. The method according to claim 2 wherein said pre-heating and drying step is continued until the humidity of gases around said material is less than 12%.

9. The method according to claim 3 wherein said temperature is between 220° C. and 230° C.

10. The method according to claim 7, wherein said difference is dependent upon the cross-section of the material to be treated.

* * * * *